Aug. 6, 1935.   C. G. KELLER   2,010,238
VEHICLE WHEEL
Filed July 28, 1932   2 Sheets-Sheet 1
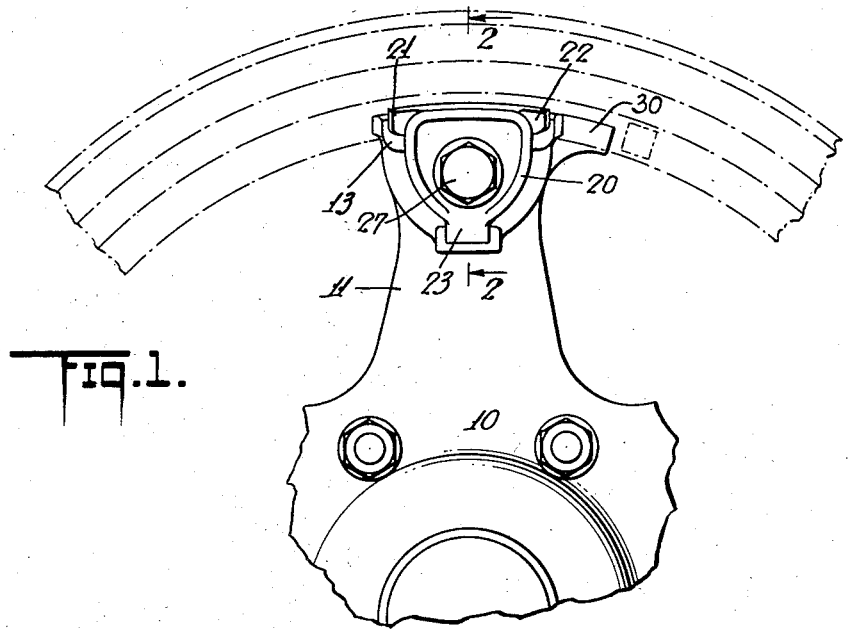
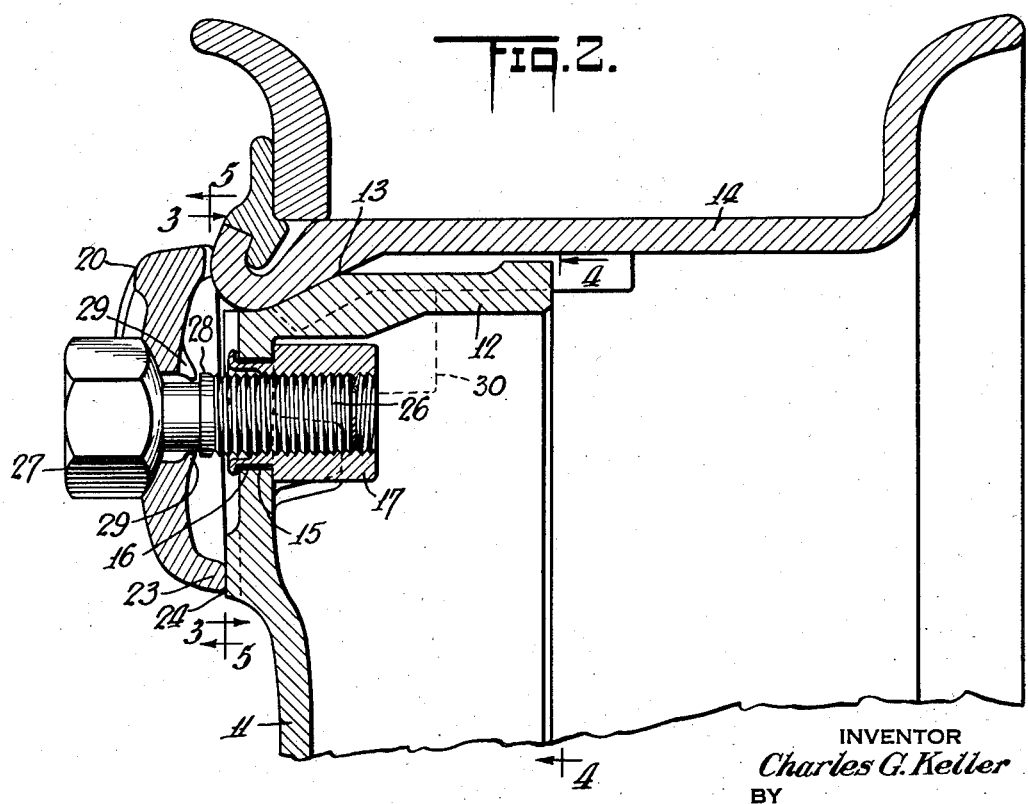
INVENTOR
Charles G. Keller
BY
ATTORNEYS Aug. 6, 1935.   C. G. KELLER   2,010,238
VEHICLE WHEEL
Filed July 28, 1932   2 Sheets-Sheet 2
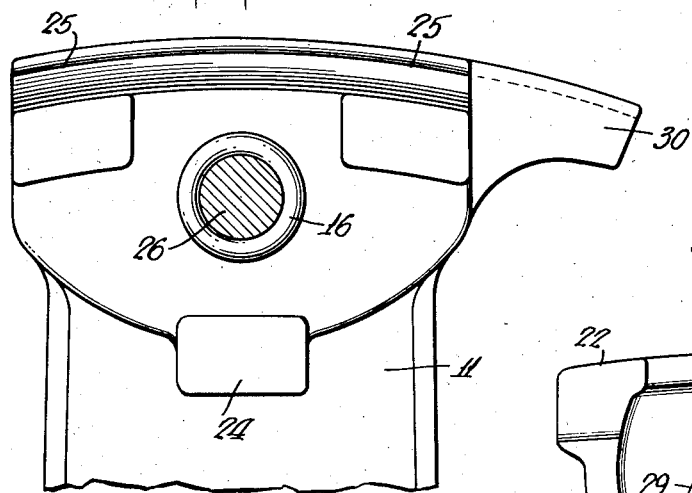
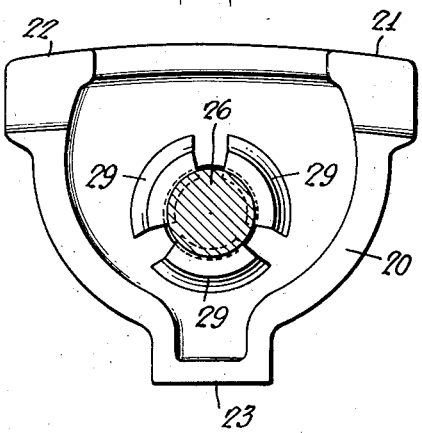
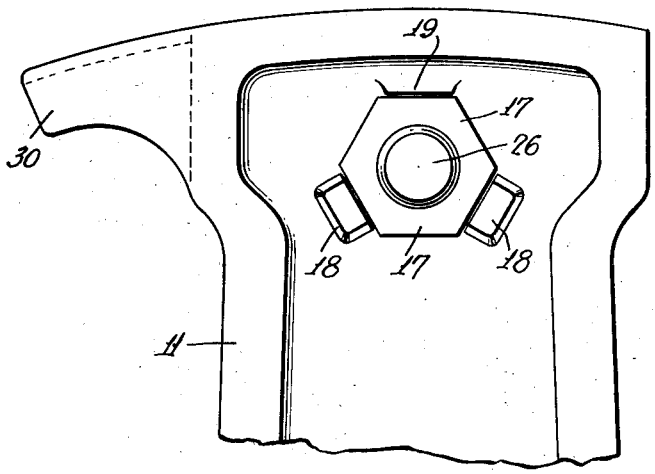
INVENTOR
*Charles G. Keller*
BY
ATTORNEYS Patented Aug. 6, 1935

2,010,238

UNITED STATES PATENT OFFICE 2,010,238

VEHICLE WHEEL

Charles G. Keller, Hyde Park, N. Y.

Application July 28, 1932, Serial No. 625,235

3 Claims. (Cl. 301—12)

This invention relates to vehicle wheels, and more particularly to the means employed for detachably securing a single rim in place. The invention is particularly applicable to a fellyless type of wheel in which the rim is secured to the ends of the separate but integral metal spokes.

The body portion of a wheel of this character is usually formed of cast metal, and the rim is secured by means of clamping bolts. To insure against liability of the rim creeping or slipping, and to force the rim into a plane at right angles to the axis of the wheel, it is often necessary to exert a great deal of force in tightening the clamping bolts. The use of such force, particularly after the parts have become coated with sand or dirt, and have slightly rusted, often results in stripping the threads, thereby rendering the securing means no longer effective.

One of the main objects of my invention is to provide a construction in which the screw threads are formed in parts which may be readily removed and replaced in case the threads become unduly worn or stripped.

A further object is to provide an adequate and effective length of threaded engagement of the parts without increasing the thickness of the cast metal spoke itself, or to have parts projecting to the outside that cause the overall width of the vehicle to be increased, sometimes beyond the legal limit.

A further object is to provide for misalignment of parts, that is, to allow the parts to shift out of their regular positions to accommodate the fitting of clamping lugs without setting up bending stresses.

A further object is to provide a construction that avoids the necessity of machining the wheel, body or spoke end for this clamping device.

A further object is to reduce to a minimum the number of parts which must be removed to permit removal and replacement of a rim.

In carrying out my invention I provide as one important feature a clamping lug which is permanently secured to the clamping bolt, and provide the spoke with a nut which is effectively held in place and prevented from rotating.

In the accompanying drawings there is illustrated merely one embodiment of my invention. In these drawings:

Fig. 1 is a view of the outboard side of a portion of a wheel embodying my invention, the rim being shown in dot and dash lines.

Fig. 2 is a radial longitudinal section on the line 2—2 of Fig. 1, but on a larger scale.

Fig. 3 is a face view of the outboard side of the end portion of the spoke, taken for instance on the line 3—3 of Fig. 2.

Fig. 4 is a similar view of the inboard side of the part shown in Fig. 3, taken for instance on the line 4—4 of Fig. 2, and Fig. 5 is a face view of the inboard side of the clamping lug, taken for instance on the line 5—5 of Fig. 2.

In the construction illustrated the wheel body 10 is provided with a plurality of hollow spokes 11 which are preferably substantially U-shape in cross-section, and preferably provided with transverse walls 12 on the radially outer ends. These transverse end walls are provided with inclined seats 13 to engage and support the beveled portion of a standard rim 14.

In carrying out my invention the wall of the spoke at the outboard side and adjacent to the radially outer end, is provided with an aperture 15 through which extends the shank 16 of a nut 17, housed within the spoke. This nut is of sufficient thickness to provide an adequate length of threaded section within the bore. The shank 16 is preferably slightly smaller than the aperture 15, and the outboard end thereof is beaded or spun over to substantially engage the outboard surface of the spoke but leave slight clearance, to thereby hold the nut loosely so as to enable it to rock into a position that aligns the nut with the cap screw as it is being tightened up.

Adjacent to but spaced from the aperture 15 the spoke has formed integral therewith one or more lugs 18, so positioned that they engage with corresponding flat sides of the nut and prevent its rotation. These lugs may in some cases be made of sufficient length to permit them to be bent over slightly at their outer ends into engagement with the inboard end of the nut so as to hold the latter against endwise movement, but this is not essential if the shank 16 be beaded over at the outboard end, as above described.

The end wall 12 of the spoke may have a lug portion 19 in the form of a ridge or flange on the radially inner side thereof and disposed closely adjacent to but slightly spaced from the radially outer side of the nut. As shown, there are two of the lugs 18, and these are so spaced in respect to the lug 19 as to lie parallel to and approximately engage alternate sides of the hex nut 17, so as to effectively prevent its rotation.

The rim clamping member is in the form of a lug 20 adapted to engage the outboard side of the spoke, and the outboard side of the rim, and to be forced toward the spoke to thereby force the rim into position on its seat 13. This clamping member or lug 20 is shown as of approximately triangular form, and may be shaped on its inboard side so as to form three corner sections, 21, 22 and 23. The radially inwardly disposed corner section 23 may engage with a seat 24 on the outboard side of the spoke, while the radially outwardly disposed corner sections 21 and 22 engage the rim.

The lug 20 is adapted to be forced into place by a screw bolt having a threaded body portion 26 and an outer head 27. The bolt is of slightly reduced diameter adjacent to the head, so as to form a shoulder 28, and the threads preferably terminate a slight distance from this shoulder so as to form a continuous annular flange. The lug 20 has an aperture therethrough to receive the bolt, and on its outboard side the aperture may be slightly concave and the adjacent surface of the bolt head may be slightly convex with the same curvature, so that the head will seat against the lug 20 even though the two be angularly displaced to a slight extent. The aperture through the lug 20 is of sufficient size to permit the free movement of the body of the bolt therethrough, but upon the inboard side the lug 20 is provided with a plurality of flanges 29 which may be bent inwardly in the rear of the shoulder 28, after the bolt has been projected through the aperture of the lug 20 to the limiting extent. By bending these flanges in behind the shoulder 28, the bolt and clamping lug 20 are permanently connected but are relatively rotatable, and a slight amount if endwise lost motion is permitted.

The clamping lug 20 is slightly concave upon its inboard side so as to house the flanges 29, while the edges of the clamping lug may directly engage the seats 24 and 25 if the parts be so designed and proportioned as to permit the rim to be distorted from true circular form, and given a predetermined draw on the seats 13. With the clamping lug in engagement with these seats 24 and 25, the mounting of the rim in a plane at right angles to the axis of the wheel is insured.

In removing a rim it is merely necessary to remove the screw bolts, as each bolt carries its corresponding clamping lug. The nuts cannot be displaced in an inboard direction, due to the beading over of the shanks 16, and when drawn in an outboard direction during the tightening of the clamping bolts, they have a firm seat against the inboard side of the wall of the spoke.

The bore through each nut is preferably slightly enlarged at the outboard end to facilitate guiding the bolt into the nut, and the proper and quick engagement of the threads. Due to the slight lost motion permitted for the nut the bolt may tilt slightly during tightening and a high degree of accuracy in the machining of the parts is not necessary.

In case a nut should become broken or its threads mutilated, the beading on the comparatively thin outer end wall of the shank may be readily cut off or bent inwardly to permit removal of the nut, and upon inserting a new nut the end of the shank may be easily hammered over to effectively retain the nut and prevent its displacement when the bolts and clamping lugs are removed.

To prevent creeping of the rim, one or more of the spokes may be provided with a laterally extending projection 30, which may engage a flange or shoulder on the radially inward side of the rim.

Having thus described my invention, what I claim as new and desire to secure by Letters Patent is:

1. A fellyless wheel body including a hollow cast metal spoke substantially U-shape in cross-section, and having a transverse wall extending on the radially outer end thereof, said transverse wall having an integral inclined seat near the outboard end thereof for directly engaging and supporting a rim, a polygonal nut housed within said spoke adjacent to the radially outer end and having a shank portion extending through said spoke to the outboard side, and loosely mounted in said spoke to permit said nut to be tilted but prevented from endwise movement, lugs integral with said spoke on the inboard side and engaging said nut for preventing the rotation of the latter, a rim clamping lug at the outboard side of said spoke, a clamping bolt extending through said rim clamping lug and threaded into said nut, and means connecting said rim clamping lug and said bolt to prevent separation and to permit relative limited tilting movement.

2. A fellyless wheel body including a metal spoke having an aperture therethrough adjacent to the radially outer end, a nut on the inboard side of said spoke and having a shank portion extending through said aperture to the outboard side, said nut being loosely mounted in said spoke to permit said nut to be tilted in any direction within predetermined limits, means on the inboard side of said spoke for preventing rotation of said nut, a rim clamping lug at the outboard side of said spoke and having an aperture therethrough, a clamping bolt extending through said latter aperture, threaded into said nut, and having a head slightly convex on its inboard side, the outboard end of said latter aperture being slightly concave and of a curvature corresponding substantially to the curvature of the inboard side of the bolt head, whereby said head will firmly seat against the clamping lug, and means connecting said rim clamping lug and said bolt to prevent separation and to permit limited relative tilting movement.

3. A fellyless wheel body including a metal spoke having an aperture therethrough adjacent to the radially outer end, a nut on the inboard side of said spoke and having a shank portion extending loosely through said aperture and beaded over at the outboard side to normally prevent removal of the nut from the aperture but permit limited tilting movement, a rim clamping lug engaging the outboard side of said spoke and having an aperture therethrough, and a clamping bolt extending through the aperture in said lug and threaded into said nut, said bolt having a polygonal head at the outboard end thereof engaging the outboard side of said rim clamping lug and being of slightly reduced diameter adjacent to said head so as to form a shoulder disposed at the inboard side of said lug and facing toward said head, said lug on the inboard side thereof being provided with flanges engaging said shoulder to limit axial movement between said lug and said bolt and to prevent separation thereof but permit limited angular movement of said bolt and said lug, and said lug being slightly concave upon its inboard side to house said flanges and said shoulder.

CHARLES G. KELLER.